United States Patent
Ito et al.

(10) Patent No.: US 12,539,750 B2
(45) Date of Patent: Feb. 3, 2026

(54) WORK VEHICLE

(71) Applicant: Kubota Corporation, Osaka (JP)

(72) Inventors: Hirokazu Ito, Sakai (JP); Takashi Shibata, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/769,566

(22) Filed: Jul. 11, 2024

(65) Prior Publication Data
US 2025/0018780 A1 Jan. 16, 2025

(30) Foreign Application Priority Data
Jul. 12, 2023 (JP) .................................. 2023-114598

(51) Int. Cl.
*B60K 17/28* (2006.01)
*B60K 1/02* (2006.01)
*B60K 1/00* (2006.01)

(52) U.S. Cl.
CPC .............. *B60K 1/02* (2013.01); *B60K 17/28* (2013.01); *B60K 2001/006* (2013.01); *B60Y 2200/221* (2013.01)

(58) Field of Classification Search
CPC .... B60K 1/02; B60K 17/28; B60K 2001/006; B60K 2001/0411; B60K 2025/005; B60Y 2200/221
See application file for complete search history.

(56) References Cited

U.S. PATENT DOCUMENTS

| | | | |
|---|---|---|---|
| 9,540,788 B2 * | 1/2017 | Naito | E02F 3/283 |
| 11,299,141 B1 * | 4/2022 | McKinzie | B60W 30/18127 |
| 12,194,825 B2 * | 1/2025 | Van Dingenen | B60K 1/02 |
| 2006/0046886 A1 * | 3/2006 | Holmes | B60K 6/387 475/5 |
| 2008/0078591 A1 * | 4/2008 | Schondorf | B60K 6/40 180/65.235 |
| 2021/0370799 A1 * | 12/2021 | Li | B60L 58/26 |
| 2022/0340001 A1 * | 10/2022 | Sagmeister | F16H 37/04 |
| 2023/0182560 A1 * | 6/2023 | Kim | B60K 11/02 310/54 |
| 2023/0322063 A1 * | 10/2023 | Van Dingenen | B60K 25/06 74/661 |

(Continued)

FOREIGN PATENT DOCUMENTS

| | | |
|---|---|---|
| JP | 5826042 B2 | 12/2015 |
| JP | 202277306 A | 5/2022 |

(Continued)

*Primary Examiner* — Farhana Pervin
(74) *Attorney, Agent, or Firm* — The Webb Law Firm

(57) ABSTRACT

A control device 50 controls rotation of a first motor 21 and controls rotation of a second motor 22. In response to receiving a forward travel command from an operating device 51, the control device 50 controls rotation of the second motor 22 in such a manner that combined motive power output by a planetary gear mechanism 41 is used as forward motive power. In response to receiving a reverse travel command from the operating device 51, the control device 50 controls rotation of the first motor 21 in such a manner that the first motor 21 decelerates or stops, and controls rotation of the second motor 22 in such a manner that motive power output by the planetary gear mechanism 41 is used as reverse motive power.

5 Claims, 4 Drawing Sheets

(56) References Cited

U.S. PATENT DOCUMENTS

| | | | | |
|---|---|---|---|---|
| 2023/0356600 A1* | 11/2023 | Matsuoka | ....... | B60W 30/18036 |
| 2024/0392876 A1* | 11/2024 | Cattoor | ................. | B60K 17/04 |
| 2024/0399849 A1* | 12/2024 | Kim | ...................... | B60K 11/04 |
| 2024/0399853 A1* | 12/2024 | Capitan | .................... | B60K 1/00 |

FOREIGN PATENT DOCUMENTS

| | | | | | |
|---|---|---|---|---|---|
| JP | 2022077307 A | | 5/2022 | | |
| WO | WO-2022102537 A1 | * | 5/2022 | ............... | B60K 1/02 |

* cited by examiner

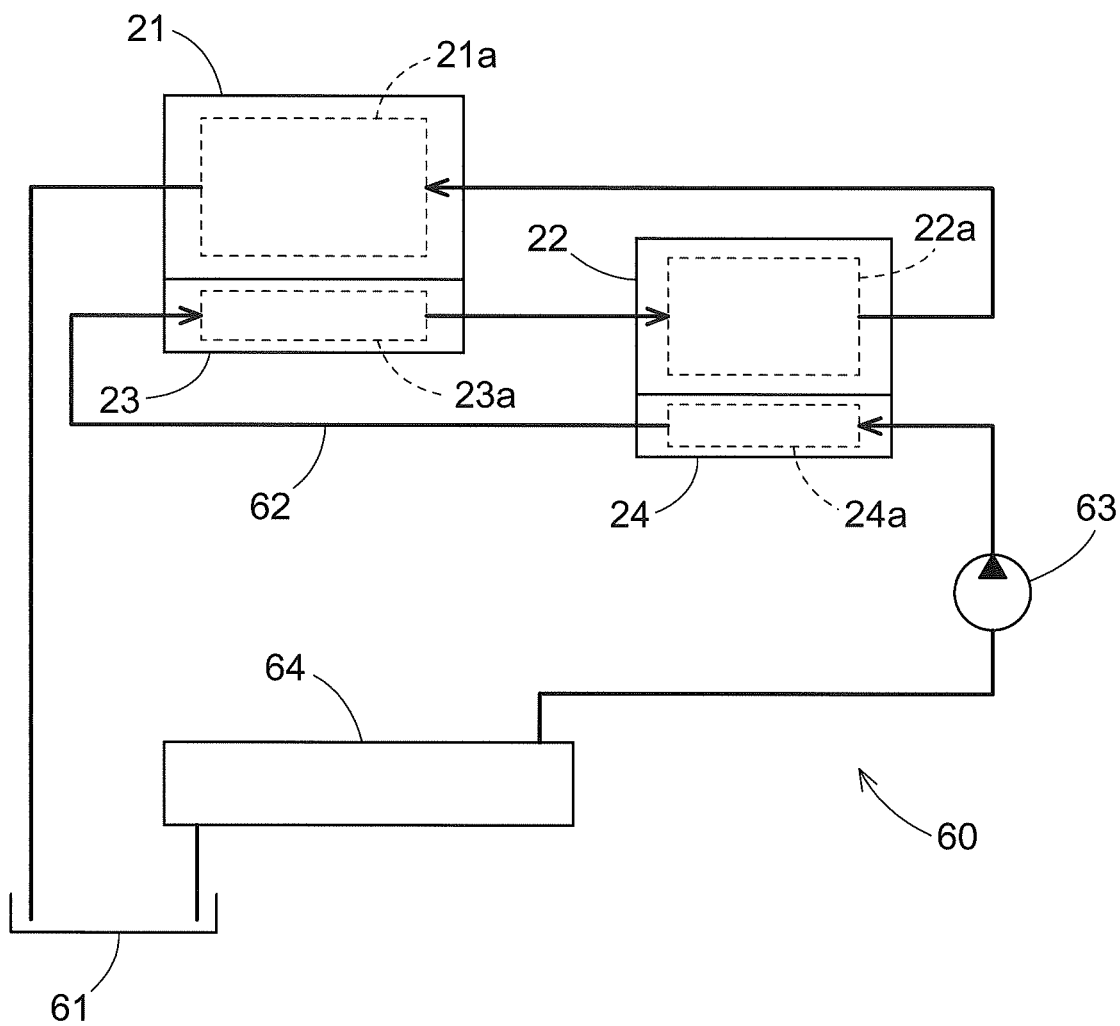

WORK VEHICLE

CROSS-REFERENCE TO RELATED APPLICATION

This application claims priority to Japanese Patent Application No. 2023-114598 filed Jul. 12, 2023, the disclosure of which is hereby incorporated by reference in its entirety.

BACKGROUND OF THE INVENTION

1. Field of the Invention

The present invention relates to a work vehicle.

2. Description of Related Art

As disclosed in Patent Document 1 (JP 2022-77306A), there is a work vehicle (tractor) that includes a first motor, a transmission mechanism (first input gear, second gear) that transmits motive power generated by the first motor to a working power output section (first output shaft), a second motor, and a planetary gear mechanism that combines motive power received from the first motor with motive power received from the second motor and outputs the combined motive power to a traveling power output section (second output shaft).

In the work vehicle described above, motive power for work is obtained by the first motor outputting motive power required for work, and motive power for travel is obtained by the planetary gear mechanism combining motive power from the first motor with motive power from the second motor and outputting the combined motive power.

SUMMARY OF THE INVENTION

The present invention provides a work vehicle in which motive power that can be output by the second motor can be efficiently used as motive power for reverse travel when traveling in reverse.

A work vehicle according to an aspect of the present invention includes: a first motor; a second motor; a transmission mechanism configured to transmit motive power from the first motor to a working power output section; a planetary gear mechanism configured to generate combined motive power by combining motive power received from the first motor with motive power received from the second motor, and output the combined motive power to a traveling power output section; a control device configured to control rotation of the first motor and control rotation of the second motor; and an operating device configured to issue a forward travel command and a reverse travel command to the control device, in response to receiving the forward travel command, the control device controlling rotation of the second motor in such a manner that the combined motive power output by the planetary gear mechanism is used as forward motive power, and in response to receiving the reverse travel command, the control device (i) controlling rotation of the first motor in such a manner that the first motor decelerates or stops, and (ii) controlling rotation of the second motor in such a manner that motive power output by the planetary gear mechanism is used as reverse motive power.

According to this configuration, in the case of traveling forward, the control device controls rotation of the first motor and rotation of the second motor based on the forward travel command from the operating device, the first motor outputs motive power required for work, motive power for work is transmitted to the working power output section, the planetary gear mechanism combines motive power from the first motor and motive power from the second motor to generate combined motive power for forward travel, and the combined motive power for forward travel is transmitted to the traveling power output section.

In the case of traveling in reverse, when the first motor is driven under control of the control device based on the reverse travel command from the operating device, the planetary gear mechanism cancels out motive power from the first motor with motive power from the second motor and outputs motive power for reverse travel. The load required to cancel out motive power from the first motor is smaller when the first motor is decelerated than when the first motor is not decelerated, and therefore the motive power that can be output by the second motor can be used efficiently to generate motive power for reverse travel. In the case of traveling in reverse, if the first motor is stopped under control of the control device based on the reverse travel command from the operating device, the planetary gear mechanism does not need to cancel out motive power from the first motor with motive power from the second motor, and outputs motive power for reverse travel using only motive power from the second motor. Since the load required to output motive power for reverse travel is smaller than when the first motor is not stopped, the motive power that can be output by the second motor can be efficiently used to generate motive power for reverse travel. In other words, by decelerating or stopping the first motor when traveling in reverse, the motive power that can be output by the second motor can be efficiently used for traveling in reverse.

In an aspect of the present invention, it is preferable that the transmission mechanism is switchable between an on state in which the transmission mechanism transmits motive power to the working power output section, and an off state in which the transmission mechanism cuts off transmission of motive power to the working power output section.

According to this configuration, the transmission mechanism can be switched to the off state in the case of traveling in reverse. As a result, in the case of traveling in reverse, if the first motor is decelerated when the planetary gear mechanism cancels out motive power from the first motor with motive power from the second motor and outputs motive power for reverse travel, the load is smaller than when the transmission mechanism is in the on state and motive power from the first motor is transmitted to the working power output section, and therefore motive power that can be output by the second motor can be efficiently used to generate motive power for reverse travel. Accordingly, motive power that can be output by the second motor can be efficiently used as motive power for reverse travel when traveling in reverse.

In an aspect of the present invention, it is preferable that the planetary gear mechanism includes: a carrier configured to receive motive power from the first motor; a sun gear configured to receive motive power from the second motor; and a ring gear configured to output combined motive power.

According to this configuration, the output shaft of the second motor and the rotation shaft of the sun gear can be coaxial, and the second motor and the planetary gear mechanism can be positioned close together to achieve a smaller size.

In an aspect of the present invention, it is preferable that the work vehicle further includes: a first inverter connected to the first motor; a second inverter connected to the second motor; and a cooling device configured to circulate and supply a refrigerant to the first motor, the second motor, the first inverter, and the second inverter.

According to this configuration, the first inverter, the second inverter, the first motor, and the second motor are cooled by the refrigerant, thus making it possible to suppress a rise in the temperature of the first inverter, the second inverter, the first motor, and the second motor. By suppressing a rise in the temperature of the first inverter, the second inverter, the first motor, and the second motor, it is possible to suppress the occurrence of a failure caused by a rise in the temperature of the first inverter, the second inverter, the first motor, and the second motor, thus making it possible to extend the time that work can be continued.

In an aspect of the present invention, it is preferable that the cooling device circulates and supplies the refrigerant in such a manner that the refrigerant passes through the first inverter and the second inverter before passing through the first motor and the second motor.

According to this configuration, the refrigerant cools the first inverter and the second inverter before cooling the first motor and the second motor, and thus the first inverter and the second inverter, which are preferably kept at a lower temperature than the first motor and the second motor, are cooled efficiently. By efficiently cooling the first inverter and the second inverter, it is easier to prevent a failure caused by a rise in the temperature of the first inverter and the second inverter.

BRIEF DESCRIPTION OF THE DRAWINGS

FIG. 5 is a schematic diagram of a cooling device.

DESCRIPTION OF THE INVENTION

Hereinafter, an embodiment of the present invention will be described with reference to the drawings.

In the following description, regarding directions relative to the body of a tractor (an example of a "work vehicle"), "front side of the body" refers to the direction of an arrow F shown in FIG. 1, "rear side of the body" refers to the direction of an arrow B shown in the same, "upper side of the body" refers to the direction of an arrow U shown in FIG. 1, "lower side of the body" refers to the direction of an arrow D shown in the same, "left side of the body" refers to the near side relative to the page in FIG. 1, and "right side of the body" refers to the far side relative to the page in the same.

Overall Configuration of Tractor

Figure 1:
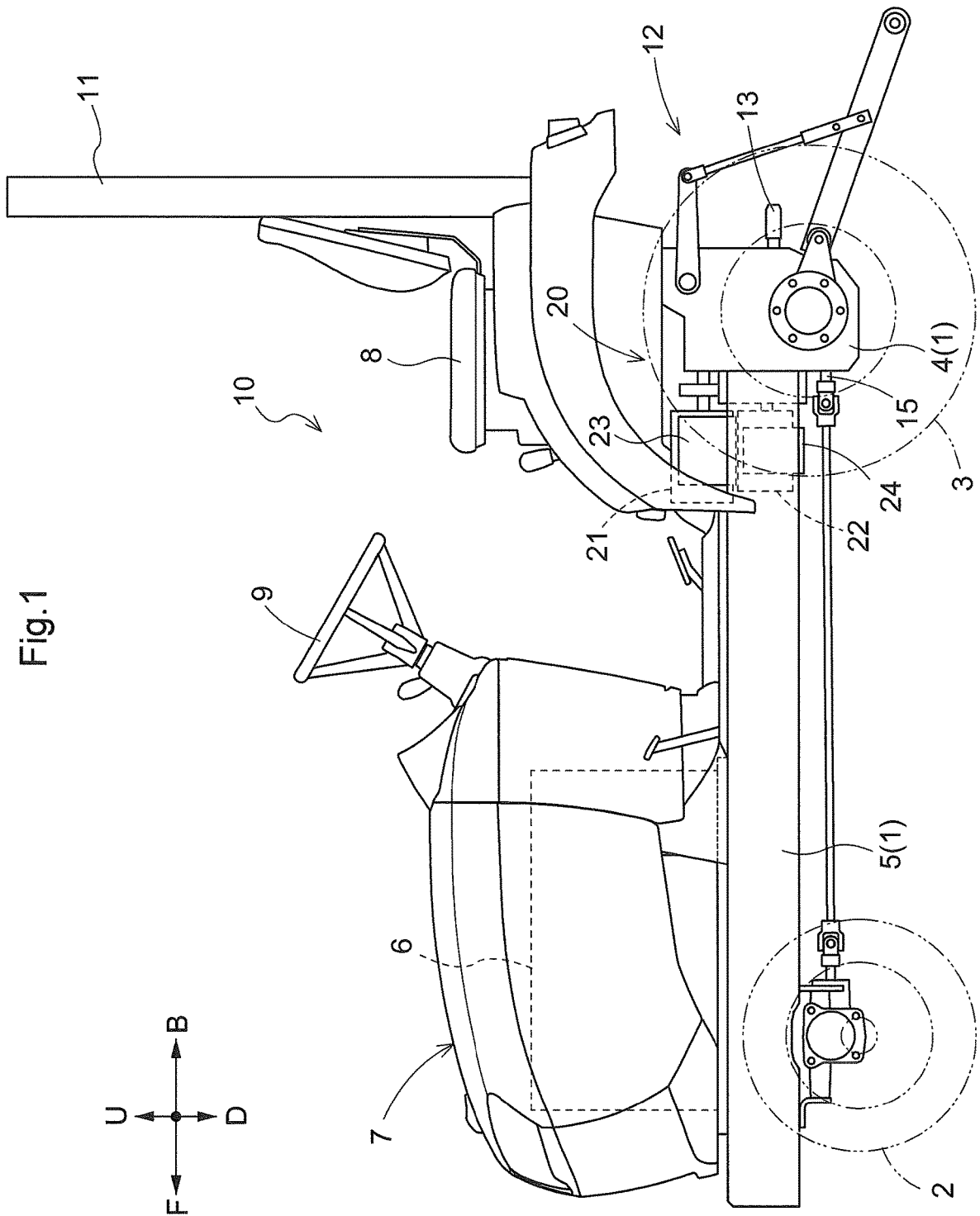
FIG. 1 is a side view of a tractor as seen from the left side.

As shown in FIG. 1, the body of the tractor includes a body frame 1, a pair of left and right front wheels 2 that can be steered and driven, and a pair of left and right rear wheels 3 that can be driven. The body frame 1 is constituted by a transmission case 4 located at the rear of the body, and a frame section 5 and the like that extend forward from the transmission case 4. A power supply section 7 that includes a battery 6 is formed in the front portion of the body. A driver section 10 that includes a driver's seat 8 and a steering wheel 9 for steering the front wheels 2 is formed in the rear portion of the body. The driver section 10 includes a ROPS 11 that extends in the up-down direction behind the driver's seat 8. A link mechanism 12 is provided in the rear portion of the body frame 1, and is for coupling various types of work devices, such as a rotary tilling device (not shown), in such a manner that the devices can be raised and lowered.

As shown in FIG. 1, a working power output section 13 for transmitting motive power to the coupled working device, a first traveling power output section 14 for transmitting motive power to the left and right rear wheels 3 (see FIG. 4), and a second traveling power output section 15 for transmitting motive power to the left and right front wheels 2 are provided in the rear portion of the body. In the present embodiment, the working power output section 13 is a power take-off shaft that protrudes rearward from the rear portion of the transmission case 4. The first traveling power output section 14 is a rear wheel differential mechanism provided inside the transmission case 4. The second traveling power output section 15 is a front wheel output shaft that protrudes forward from the front portion of the transmission case 4.

Motive Power Transmission Device

Figure 2:
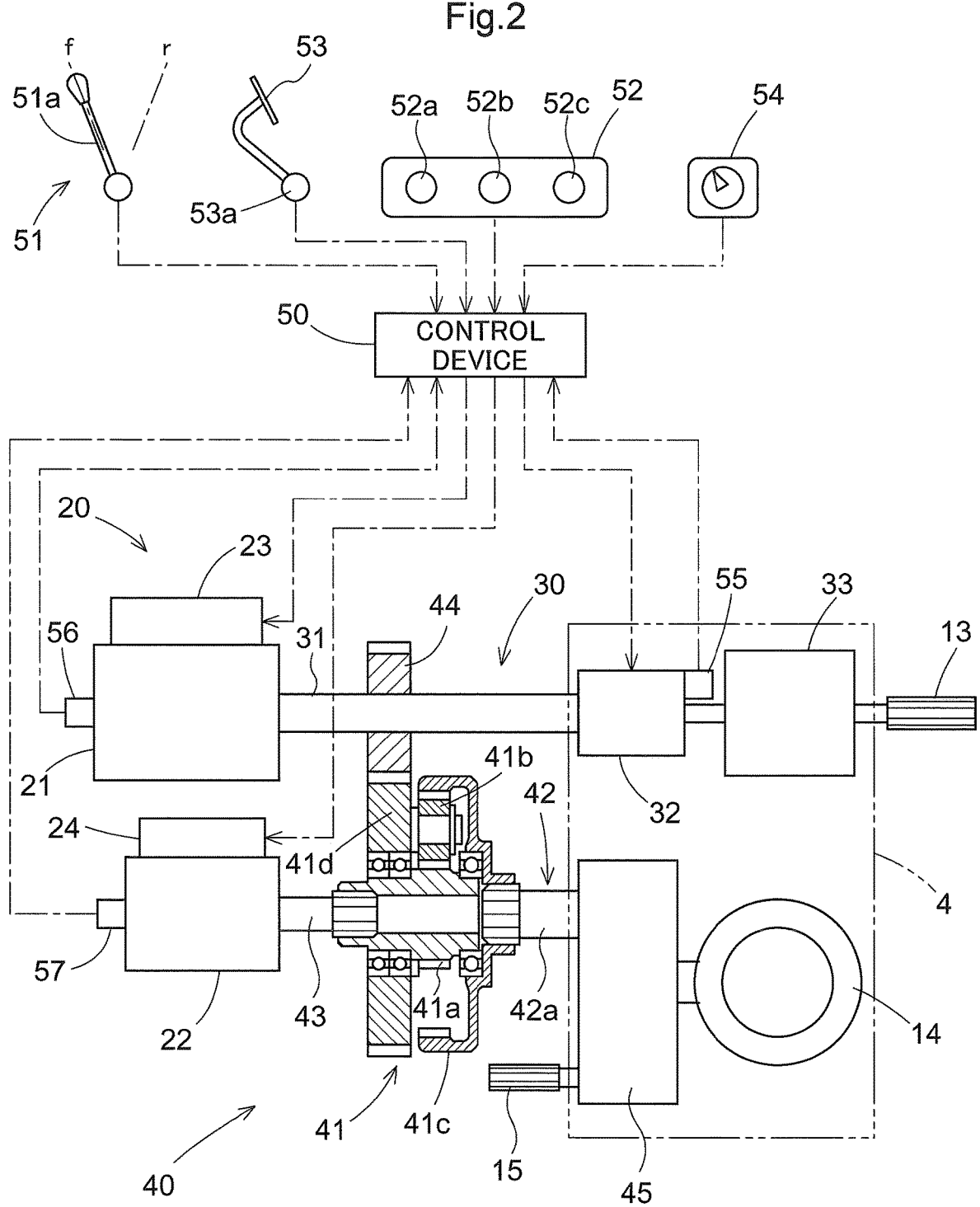
FIG. 2 is a schematic diagram of a motive power transmission device.

A motive power transmission device 20 that transmits motive power to the working power output section 13, the first traveling power output section 14, and the second traveling power output section 15 is shown in FIG. 2. The motive power transmission device 20 includes a first motor 21, a second motor 22, a first transmission mechanism 30 coupled to the first motor 21, and a second transmission mechanism 40 coupled to the first motor 21 and the second motor 22.

Figure 3:
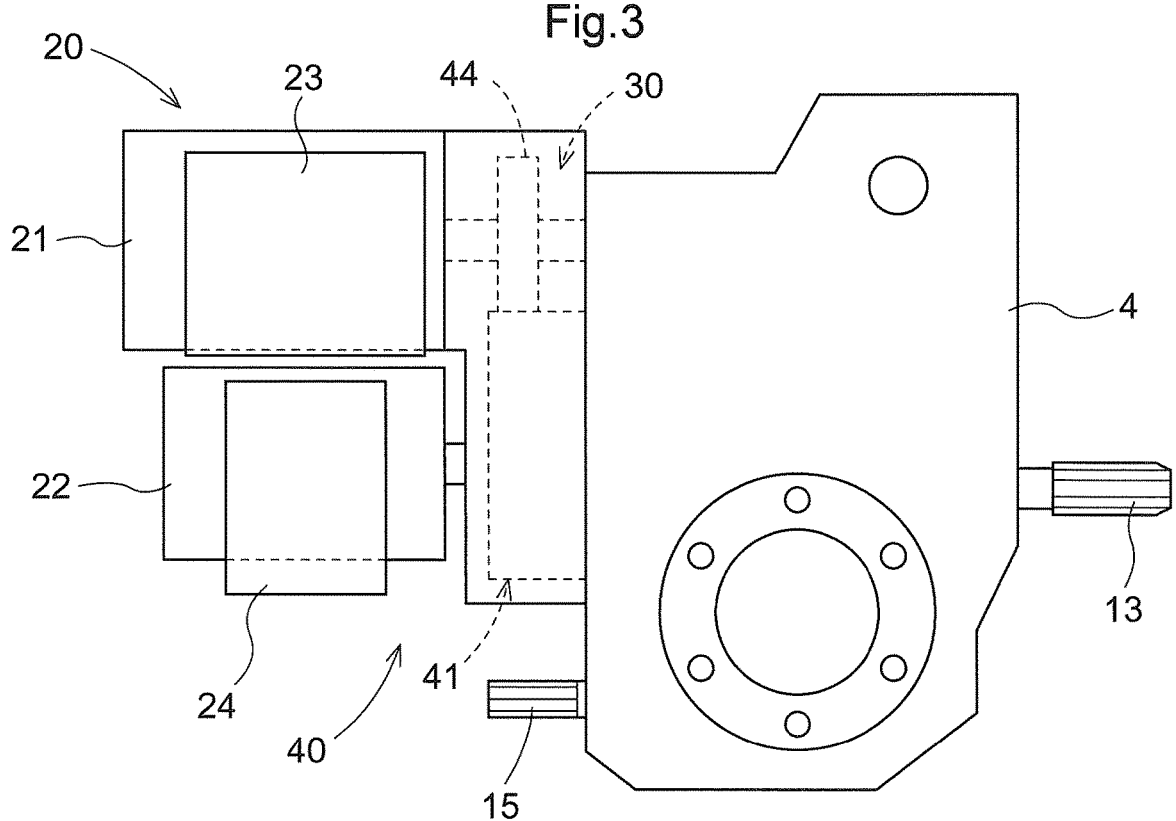
FIG. 3 is a side view of a first motor, a second motor, a first inverter, a second inverter, and a transmission case.

As shown in FIG. 1, the first motor 21 and the second motor 22 are provided in the rear portion of the body. As shown in FIGS. 1 and 3, the first motor 21 and the second motor 22 are provided in front of the transmission case 4. The first motor 21 and the second motor 22 are arranged next to each other in the up-down direction such that the first motor 21 is located above the second motor 22. In the present embodiment, the first motor 21 and the second motor 22 are electric motors. The first motor 21 is driven by electric power supplied from the battery 6 via a first inverter 23 (see FIGS. 3 and 4). The second motor 22 is driven by electric power supplied from the battery 6 via a second inverter 24 (see FIGS. 3 and 4). The first motor 21 is constituted by a motor capable of generating a higher output than the second motor 22.

As shown in FIG. 2, the first transmission mechanism 30 transmits motive power output by the first motor 21 to the working power output section 13.

In detail, as shown in FIG. 2, the first transmission mechanism 30 includes a first rotation shaft 31 extending from the first motor 21, a work clutch 32 coupled to the first rotation shaft 31, and a work transmission device 33 coupled to the work clutch 32. The first transmission mechanism 30 transmits motive power output by the first motor 21 to the working power output section 13 via the first rotation shaft 31, the work clutch 32, and the work transmission device 33. The first transmission mechanism 30 changes the speed of the motive power from the first motor 21 with use of the work transmission device 33, and transmits the resulting motive power to the working power output section 13. When the work clutch 32 is engaged, the first transmission mechanism 30 switches to the on state so as to transmit motive power from the first motor 21 to the working power output section 13, and when the work clutch 32 is disengaged, the first transmission mechanism 30 switches to the off state so as to cut off the transmission of motive power from the first motor 21 to the working power output section 13.

The second transmission mechanism 40 can transmit both motive power output by the first motor 21 and motive power output by the second motor 22 to the first traveling power output section 14 and the second traveling power output section 15, and can also transmit only motive power output by the second motor 22 to the first traveling power output section 14 and the second traveling power output section 15.

Specifically, as shown in FIG. 2, the second transmission mechanism 40 includes a planetary gear mechanism 41 that receives motive power from the first motor 21 and motive power from the second motor 22, and a travel transmission section 42 that transmits the output of the planetary gear mechanism 41 to the first traveling power output section 14 and the second traveling power output section 15.

As shown in FIG. 2, the planetary gear mechanism 41 includes a sun gear 41a, a planetary gear 41b meshed with the sun gear 41a, a ring gear 41c having internal teeth meshed with the planetary gear 41b, and a carrier 41d that holds the planetary gear 41b in such a manner that it can both rotate and revolve.

The sun gear 41a is held by a second rotation shaft 43 extending from the second motor 22. Motive power from the second motor 22 is transmitted to the sun gear 41a via the second rotation shaft 43. The teeth formed on the carrier 41d and a transmission gear 44 provided on the first rotation shaft 31 are meshed with each other. The transmission gear 44 is provided on the first rotation shaft 31 at a location between the first motor 21 and the work clutch 32. When motive power from the first motor 21 is transmitted to the carrier 41d via the transmission gear 44 and the first rotation shaft 31, the carrier 41d is driven by motive power from the first motor 21, and the planetary gear 41b is driven by motive power from the first motor 21. The ring gear 41c and an input shaft 42a of the travel transmission section 42 are coupled to each other.

In the planetary gear mechanism 41, in response to the first motor 21 being driven at a set rotational speed for work, which is set as the rotational speed for driving the working device, and the second motor 22 being controlled to rotate for forward movement, motive power transmitted from the first motor 21 is combined with motive power transmitted from the second motor 22 to generate combined motive power for forward movement, and the generated combined motive power for forward movement is output to the input shaft 42a of the travel transmission section 42.

In the planetary gear mechanism 41, in response to the first motor 21 being driven at the set rotational speed for work, which is set as the rotational speed for driving the working device, and the second motor 22 being controlled to rotate for reverse movement, motive power transmitted from the first motor 21 is cancelled out by motive power transmitted from the second motor 22 to generate motive power for reverse movement, and the generated motive power for reverse movement is output to the input shaft 42a of the travel transmission section 42.

In the planetary gear mechanism 41, in response to the first motor 21 being controlled to stop and the second motor 22 being controlled to rotate for reverse movement, motive power for reverse movement is generated by motive power transmitted from the second motor 22, and the generated motive power for reverse movement is output to the input shaft 42a of the travel transmission section 42.

As shown in FIG. 2, the travel transmission section 42 includes the input shaft 42a to which the output of the planetary gear mechanism 41 is transmitted, and a travel transmission device 45 that changes the speed of motive power input by the input shaft 42a and transmits the resulting motive power to the first traveling power output section 14 and the second traveling power output section 15.

As shown in FIG. 2, a control device 50 is linked to the first motor 21, the second motor 22, and the work clutch 32. The control device 50 is linked to the first motor 21 by linking the control device 50 to the first inverter 23, which controls the first motor 21. The control device 50 is linked to the second motor 22 by linking the control device 50 to the second inverter 24, which controls the second motor 22. The control device 50 is linked to an operating device 51, a control mode selection device 52, and a speed change pedal 53. The control device 50 is linked to the speed change pedal 53 by linking the control device 50 to a pedal sensor 53a provided on the speed change pedal 53. The pedal sensor 53a detects the operation position of the speed change pedal 53 and provides corresponding detection information to the control device 50. The control device 50 is constituted using a microcomputer.

As shown in FIG. 2, the operating device 51 includes a forward/reverse lever 51a. The forward/reverse lever 51a can be operated by the driver. The operating device 51 issues a forward command to the control device 50 in response to the forward/reverse lever 51a being operated to the forward position [f], and issues a reverse command to the control device 50 in response to the forward/reverse lever 51a being operated to the reverse position [r].

As shown in FIG. 2, the control mode selection device 52 includes a first mode switch 52a, a second mode switch 52b, and a third mode switch 52c. The first mode switch 52a, the second mode switch 52b, and the third mode switch 52c can be operated by the driver.

In response to the first mode switch 52a being turned on, the control mode selection device 52 issues a first mode command to the control device 50, thereby causing rotation of the first motor 21, rotation of the second motor 22, and switching of the work clutch 32 to be controlled by the control device 50 in a first reverse control mode.

In response to the second mode switch 52b being turned on, the control mode selection device 52 issues a second mode command to the control device 50, thereby causing rotation of the first motor 21, rotation of the second motor 22, and switching of the work clutch 32 to be controlled by the control device 50 in a second reverse control mode.

In response to the third mode switch 52c being turned on, the control mode selection device 52 issues a third mode command to the control device 50, thereby causing rotation of the first motor 21 and rotation of the second motor 22 to be controlled by the control device 50 in a third reverse control mode.

As shown in FIG. 2, a speed adjustment device 54 is linked to the control device 50. When work is to be performed while traveling, the speed adjustment device 54 sets the speed of the first motor 21 in such a manner that the first motor 21 outputs motive power at a set rotational speed for work, which is set as the rotational speed of motive power for driving the coupled working device. If various types of working devices that have different specifications and the like can be used, the speed of the first motor 21 is set in accordance with the working device in such a manner that motive power at a suitable set rotational speed for work is output to the working device.

In response to receiving a forward movement command, the control device 50 switches the work clutch 32 to the engaged state based on the forward movement command and detection information from a clutch sensor 55 that detects whether the work clutch 32 is engaged or disengaged.

In response to receiving a forward movement command, the control device 50 ignores the mode command from the control mode selection device 52 and controls rotation of the first motor 21 and rotation of the second motor 22 based on the forward movement command, information from the speed adjustment device 54, detection information from a first rotation sensor 56 that detects the rotation speed of the first motor 21, and detection information from a second rotation sensor 57 that detects the rotation direction and the rotation speed of the second motor 22. Specifically, the control device 50 issues a predetermined first motor drive command to the first inverter 23 to control rotation of the first motor 21 in such a manner that the first motor 21 is driven at a set rotational speed for work, and issues a predetermined second motor drive command to the second inverter 24 to control rotation of the second motor 22 in such a manner that the planetary gear mechanism 41 combines motive power from the first motor 21 and motive power from the second motor 22 to generate combined motive power for forward movement.

In response to receiving a reverse travel command, in the case where the first mode command has been issued, the control device 50 switches the work clutch 32 to the engaged state based on the reverse travel command, the first mode command, and detection information from the clutch sensor 55.

In response to receiving a reverse travel command, in the case where the first mode command has been issued, based on the reverse travel command, the first mode command, and detection information from the first rotation sensor 56, the control device 50 issues a predetermined first motor drive command to the first inverter 23 to control the first motor 21 to decelerate in such a manner that the first motor 21 is driven at a set rotation speed for reverse travel that is slower than the set rotation speed for work.

In response to receiving a reverse travel command, in the case where the first mode command has been given, based on the reverse travel command, the first mode command, and detection information from the second rotation sensor 57, the control device 50 issues a predetermined second motor drive command to the second inverter 24 to control rotation of the second motor 22 in such a manner that the planetary gear mechanism 41 cancels out motive power from the first motor 21 with motive power from the second motor 22 and outputs motive power for reverse travel.

In response to receiving a reverse travel command, in the case where the second mode command has been issued, the control device 50 switches the work clutch 32 to the disengaged state based on the reverse travel command, the second mode command, and detection information from the clutch sensor 55.

In response to receiving a reverse travel command, in the case where the second mode command has been issued, based on the reverse travel command, the second mode command, and detection information from the first rotation sensor 56, the control device 50 issues a predetermined first motor drive command to the first inverter 23 to control the first motor 21 to decelerate in such a manner that the first motor 21 is driven at a set rotation speed for reverse travel that is slower than the set rotation speed for work.

In response to receiving a reverse travel command, in the case where the second mode command has been issued, based on the reverse travel command, the second mode command, and detection information from the second rotation sensor 57, the control device 50 issues a predetermined second motor drive command to the second inverter 24 to control rotation of the second motor 22 in such a manner that the planetary gear mechanism 41 cancels out motive power from the first motor 21 with motive power from the second motor 22 and outputs motive power for reverse travel.

In response to receiving a reverse travel command, in the case where the third mode command has been issued, based on the reverse travel command, the third mode command, and detection information from the first rotation sensor 56, the control device 50 issues a command for stopping the first motor 21 to the first inverter 23, thus stopping the first motor 21.

In response to receiving a reverse travel command, in the case where the third mode command has been issued, based on the reverse travel command, the third mode command, and detection information from the second rotation sensor 57, the control device 50 issues a predetermined second motor drive command to the second inverter 24 to control rotation of the second motor 22 in such a manner that the planetary gear mechanism 41 outputs motive power for reverse travel using motive power from the second motor 22.

In response to the speed change pedal 53 being operated while a forward travel command has been issued, based on detection information from the pedal sensor 53a and detection information from the second rotation sensor 57, the control device 50 issues a speed change and drive command for the second motor 22 to the second inverter 24 to control rotation of the second motor 22 in such a manner that the planetary gear mechanism 41 outputs combined motive power for forward travel at a rotation speed that corresponds to the operation position of the speed change pedal 53.

In response to the speed change pedal 53 being operated while a reverse travel command has been issued, based on detection information from the pedal sensor 53a and detection information from the second rotation sensor 57, the control device 50 issues a speed change and drive command for the second motor 22 to the second inverter 24 to control rotation of the second motor 22 in such a manner that the planetary gear mechanism 41 outputs combined motive power for reverse travel at a rotation speed that corresponds to the operation position of the speed change pedal 53.

When work is to be performed while traveling, the speed adjustment device 54 is operated to set the speed of the first motor 21, and the forward/reverse lever 51a is switched to the forward position [f]. Accordingly, the control device 50 controls rotation of the first motor 21 in such a manner that the first motor 21 is driven at a set rotation speed for work that corresponds to the coupled working device. The control device 50 switches the work clutch 32 to the engaged state, and thus the first transmission mechanism 30 enters the on state, and motive power output by the first motor 21 is transmitted to the working power output section 13 by the first transmission mechanism 30. Motive power at an appropriate rotation speed for driving the working device can be taken off from the working power output section 13 and transmitted to the working device. The control device 50 controls rotation of the second motor 22 in such a manner that the planetary gear mechanism 41 combines motive power from the first motor 21 and motive power from the second motor 22 to generate combined motive power for forward travel, and outputs the combined motive power for forward travel. The combined motive power for forward travel output by the planetary gear mechanism 41 is transmitted to the first traveling power output section 14 and the second traveling power output section 15 by the travel transmission section 42. The combined motive power for forward travel is transmitted from the first traveling power output section 14 to the rear wheels 3, and the rear wheels 3 are driven in the forward direction. The combined motive power for forward travel is transmitted from the second traveling power output section 15 to the front wheels 2, and the front wheels 2 are driven in the forward direction.

In order to travel in reverse, the forward/reverse lever 51a is switched to the reverse position [r]. In response to the first mode switch 52a being operated, rotation of the first motor 21, rotation of the second motor 22, and switching of the work clutch 32 are controlled by the control device 50 in the first reverse control mode. Specifically, the control device 50 controls the first motor 21 to decelerate in such a manner that the first motor 21 rotates at a rotation speed lower than the set rotation speed for work. The control device 50 switches the work clutch 32 to the engaged state, and thus the first transmission mechanism 30 enters the on state, and motive power output by the first motor 21 is transmitted to the working power output section 13 by the first transmission mechanism 30. The control device 50 controls the second motor 22 to rotate for reverse travel, and thus the planetary gear mechanism 41 cancels out motive power from the first motor 21 with motive power from the second motor 22, generates motive power for reverse travel using motive power from the second motor 22, and outputs the motive power for reverse travel. The first motor 21 rotates at a rotation speed slower than the set rotation speed for work, and thus the load required to cancel out motive power from the first motor 21 is lower than in the case where the first motor 21 rotates at the set rotation speed for work, and motive power from the second motor 22 can be efficiently utilized to generate motive power for reverse travel. The motive power for reverse travel output by the planetary gear mechanism 41 is transmitted to the first traveling power output section 14 and the second traveling power output section 15 by the travel transmission section 42. The motive power for reverse travel is transmitted from the first traveling power output section 14 to the rear wheels 3, and the rear wheels 3 are driven in the reverse direction. The motive power for reverse travel is transmitted from the second traveling power output section 15 to the front wheels 2, and the front wheels 2 are driven in the reverse direction.

In order to travel in reverse, the forward/reverse lever 51a is switched to the reverse position [r]. In response to the second mode switch 52b being operated, rotation of the first motor 21, rotation of the second motor 22, and switching of the work clutch 32 are controlled by the control device 50 in the second reverse control mode. Specifically, the control device 50 controls the first motor 21 to decelerate in such a manner that the first motor 21 rotates at a rotation speed lower than the set rotation speed for work. The control device 50 switches the work clutch 32 to the disengaged state, and thus the first transmission mechanism 30 enters the off state, and motive power output by the first motor 21 is not transmitted to the working power output section 13. The control device 50 controls the second motor 22 to rotate for reverse travel, and thus the planetary gear mechanism 41 cancels out motive power from the first motor 21 with motive power from the second motor 22, generates motive power for reverse travel using motive power from the second motor 22, and outputs the motive power for reverse travel. Since the first motor 21 rotates at a rotation speed slower than the set rotation speed for work and motive power output by the first motor 21 is not transmitted to the working power output section 13, the load required to cancel out motive power from the first motor 21 is lower than in the case where the first motor 21 rotates at the set rotation speed for work and motive power from the first motor 21 is transmitted to the working power output section 13, and motive power from the second motor 22 can be efficiently utilized to generate motive power for reverse travel. The motive power for reverse travel output by the planetary gear mechanism 41 is transmitted to the first traveling power output section 14 and the second traveling power output section 15 by the travel transmission section 42. The motive power for reverse travel is transmitted from the first traveling power output section 14 to the rear wheels 3, and the rear wheels 3 are driven in the reverse direction. The motive power for reverse travel is transmitted from the second traveling power output section 15 to the front wheels 2, and the front wheels 2 are driven in the reverse direction.

In order to travel in reverse, the forward/reverse lever 51a is switched to the reverse position [r]. In response to the third mode switch 52c being operated, rotation of the first motor 21 and rotation of the second motor 22 are controlled by the control device 50 in the third reverse control mode. In other words, the control device 50 stops the first motor 21. The control device 50 controls the second motor 22 to rotate for reverse travel, and the planetary gear mechanism 41 generates motive power for reverse travel using motive power from the second motor 22, and outputs the motive power for reverse travel. Since the first motor 21 is stopped, motive power from the second motor 22 can be more efficiently utilized to generate motive power for reverse travel than in the case where the first motor 21 is rotating and motive power from the first motor 21 is cancelled out to generate motive power for reverse travel. The motive power for reverse travel output by the planetary gear mechanism 41 is transmitted to the first traveling power output section 14 and the second traveling power output section 15 by the travel transmission section 42. The motive power for reverse travel is transmitted from the first traveling power output section 14 to the rear wheels 3, and the rear wheels 3 are driven in the reverse direction. The motive power for reverse travel is transmitted from the second traveling power output section 15 to the front wheels 2, and the front wheels 2 are driven in the reverse direction.

Cooling Device

Figure 4:
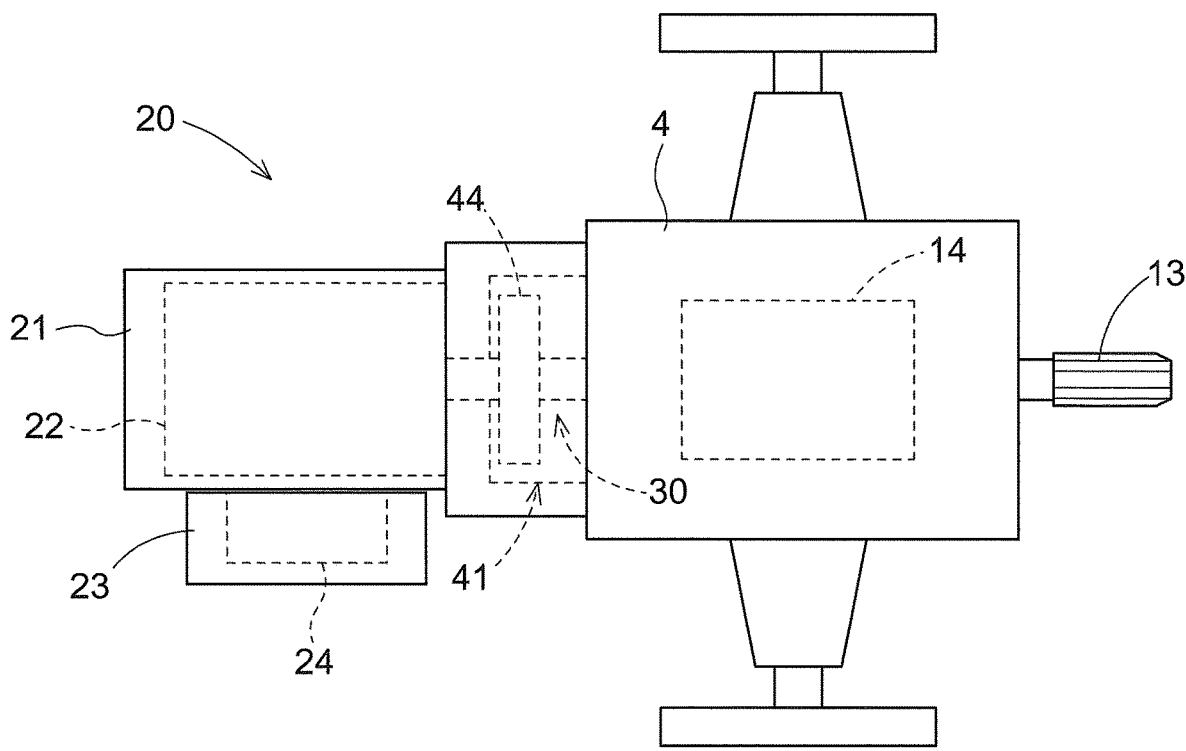
FIG. 4 is a plan view of the first motor, the second motor, the first inverter, the second inverter, and the transmission case.

As shown in FIGS. 3 and 4, the first inverter 23 is connected to the first motor 21, and converts a direct current from the battery 6 into an alternating current and supplies the alternating current to the first motor 21. The second inverter 24 is connected to the second motor 22, and converts a direct current from the battery 6 into an alternating current and supplies the alternating current to the second motor 22. The first inverter 23 is attached to a lateral portion of the first motor 21 and is held by the first motor 21. The second inverter 24 is attached to a lateral portion of the second motor 22 and is held by the second motor 22.

As shown in FIG. 5, a cooling device 60 is provided for the first motor 21, the second motor 22, the first inverter 23, and the second inverter 24.

As shown in FIG. 5, the cooling device 60 includes a refrigerant circulation path 62 that circulates a refrigerant between the first inverter 23, the second inverter 24, the first motor 21, the second motor 22, and a refrigerant tank 61. A circulation pump 63 is provided in the refrigerant circulation path 62.

In the cooling device 60, cooling water serving as the refrigerant stored in the refrigerant tank 61 is drawn out of the refrigerant tank 61 by the circulation pump 63. The drawn cooling water is supplied from the circulation pump 63 to the refrigerant circulation path 62 and then supplied to the second inverter 24, the first inverter 23, the second motor 22, and the first motor 21, and thus the second inverter 24, the first inverter 23, the second motor 22, and the first motor 21 are cooled by the supplied cooling water. After cooling the second inverter 24, the first inverter 23, the second motor 22, and the first motor 21, the cooling water is returned to refrigerant tank 61 via the refrigerant circulation path 62.

As shown in FIG. 5, a radiator 64 is provided in the refrigerant circulation path 62 at a location between the refrigerant tank 61 and the circulation pump 63. The cooling water drawn out from the refrigerant tank 61 by the circulation pump 63 is cooled by the radiator 64 before flowing into the circulation pump 63.

As shown in FIG. 5, the cooling device 60 is configured to circulate and supply the cooling water from the circulation pump 63 so as to pass through the second inverter 24 and the first inverter 23 before passing through the second motor 22 and the first motor 21. Since it is preferable that the first inverter 23 and the second inverter 24 are kept at a lower temperature than the first motor 21 and the second motor 22, the cooling water is supplied to the inverters before the first motor 21 and the second motor 22.

As shown in FIG. 5, the cooling device 60 is configured to circulate and supply cooling water from the circulation pump 63 so as to pass through the second inverter 24 before passing through the first inverter 23.

As shown in FIG. 5, the cooling device 60 is configured to circulate and supply cooling water from the circulation pump 63 so as to pass through the second motor 22 before passing through the first motor 21.

Specifically, as shown in FIG. 5, the first inverter 23 is provided with a first inverter cooling section 23a, and the second inverter 24 is provided with a second inverter cooling section 24a. The first motor 21 is provided with a first motor cooling section 21a, and the second motor 22 is provided with a second motor cooling section 22a. The first inverter cooling section 23a, the second inverter cooling section 24a, the first motor cooling section 21a, and the second motor cooling section 22a are each a cooling jacket.

As shown in FIG. 5, the refrigerant circulation path 62 is formed so as to extend from the circulation pump 63 to the second inverter cooling section 24a, pass through the second inverter cooling section 24a and then through the first inverter cooling section 23a, then pass through the first inverter cooling section 23a and then through the second motor cooling section 22a, then pass through the second motor cooling section 22a and then through the first motor cooling section 21a, and then return from the first motor cooling section 21a to the refrigerant tank 61.

Other Embodiments (1) Although the first motor 21 is a motor that has a higher output than the second motor 22 in the above embodiment, the present invention is not limited to this. For example, the second motor 22 may be a motor that has the same output as the first motor 21, or the second motor 22 may be a motor that has a higher output than the first motor 21.

(2) Although an example in which the cooling device 60 is provided has been described in the above embodiment, the cooling device 60 may be omitted. In the case where the cooling device 60 is provided, the refrigerant may be a refrigerant gas instead of cooling water.

(3) Although an example in which the refrigerant is circulated and supplied so as to pass through the second inverter 24 and then through the first inverter 23 is described in the above embodiment, the present invention is not limited to this, and the refrigerant may be circulated and supplied so as to pass through the first inverter 23 and then through the second inverter 24.

(4) Although an example in which the refrigerant is circulated and supplied so as to pass through the second motor 22 and then through the first motor 21 is described in the above embodiment, the present invention is not limited to this, and the refrigerant may be circulated and supplied so as to pass through the first motor 21 and then through the second motor 22.

(5) Although an example has been described in which, in the planetary gear mechanism 41, motive power from the first motor 21 is input to the carrier 41d and motive power from the second motor 22 is input to the sun gear 41a, the present invention is not limited to this, and motive power from the first motor 21 and motive power from the second motor 22 may be input to any gear of the planetary gear mechanism 41.

INDUSTRIAL APPLICABILITY

The present invention is applicable to a work vehicle that includes a transmission mechanism that transmits motive power from a first motor to a working power output section, and a planetary gear mechanism that combines motive power from the first motor with motive power from a second motor and transmits the combined motive power to a traveling power output section. For example, the present invention is applicable to tractors, grass cutters, and the like.

LIST OF REFERENCE SIGNS

13 Working power output section
14 First traveling power output section (traveling power output section)
15 Second traveling power output section (traveling power output section)
21 First motor
22 Second motor
23 First inverter
24 Second inverter
30 First transmission mechanism (transmission mechanism)
41 Planetary gear mechanism
41a Sun gear
41c Ring gear
41d Carrier
50 Control device
51 Operating device
60 Cooling device

What is claimed is:

1. A work vehicle comprising:
a first motor;
a second motor;
a transmission mechanism configured to transmit motive power from the first motor to a working power output section;
a planetary gear mechanism configured to generate combined motive power by combining motive power received from the first motor with motive power received from the second motor, and output the combined motive power to a traveling power output section;
a control device configured to control rotation of the first motor and control rotation of the second motor; and
an operating device configured to issue a forward travel command and a reverse travel command to the control device, and
wherein in response to receiving the forward travel command, the control device controlling rotation of the second motor in such a manner that the combined motive power output by the planetary gear mechanism is used as forward motive power, and wherein in response to receiving the reverse travel command, the control device (i) controlling rotation of the first motor in such a manner that the first motor decelerates or stops, and (ii) controlling rotation of the second motor in such a manner that motive power output by the planetary gear mechanism is used as reverse motive power, and the work vehicle further comprises:
- a first inverter directly connected to the first motor;
- a second inverter directly connected to the second motor; and
- a cooling device configured to circulate and supply a refrigerant to the first motor, the second motor, the first inverter, and the second inverter, and
- the cooling device circulates and supplies the refrigerant in such a manner that the refrigerant passes sequentially through the second inverter, the first inverter, the second motor, and the first motor.

2. The work vehicle according to claim 1,
wherein the transmission mechanism is switchable between an on state wherein the transmission mechanism transmits motive power to the working power output section, and an off state wherein the transmission mechanism cuts off transmission of motive power to the working power output section.

3. The work vehicle according to claim 2, further comprising:

a mode operating device configured to issue a control mode command to the control device, wherein the control mode command comprises a first mode command and a second mode command, in response to receiving the reverse travel command and the first mode command, the control device controls the rotation of the first motor to decelerate the first motor and switches the transmission mechanism to the on state, and in response to receiving the reverse travel command and the second mode command, the control device controls the rotation of the first motor to decelerate the first motor and switches the transmission mechanism to the off state.

4. The work vehicle according to claim 3,
wherein the control mode command comprises a third mode command, and
in response to receiving the reverse travel command and the third mode command, the control device controls the rotation of the first motor to stop the first motor.

5. The work vehicle according to claim 1,
wherein the planetary gear mechanism comprises:
- a carrier configured to receive motive power from the first motor;
- a sun gear configured to receive motive power from the second motor; and
- a ring gear configured to output combined motive power.

\* \* \* \* \*